(12) United States Patent
Benson et al.

(10) Patent No.: US 6,676,882 B2
(45) Date of Patent: Jan. 13, 2004

(54) METHODS OF HOT-MELT RESIN IMPREGNATION OF 3-D, WOVEN, TEXTILE PREFORMS

(75) Inventors: Ross A. Benson, Willow Park, TX (US); Larry R. Bersuch, Fort Worth, TX (US); Harry R. Miller, Fort Worth, TX (US); Ronald P. Schmidt, Fort Worth, TX (US); Linas Repecka, Lakewood, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 103 days.

(21) Appl. No.: 09/942,332

(22) Filed: Aug. 28, 2001

(65) Prior Publication Data

US 2003/0042659 A1 Mar. 6, 2003

(51) Int. Cl.⁷ ............................ B29C 70/44; B32B 31/12
(52) U.S. Cl. .................. 264/510; 264/511; 264/248; 264/255; 264/257; 264/258; 264/137; 156/286; 156/289; 156/309.6; 156/382
(58) Field of Search .................. 264/510, 511, 264/512, 571, 134, 135, 136, 137, 252, 258, 129, 248, 255; 156/286, 289, 309.6, 382

(56) References Cited

U.S. PATENT DOCUMENTS

| | | | |
|---|---|---|---|
| 4,379,798 A | * 4/1983 | Palmer et al. | ............... 428/113 |
| 4,622,091 A | 11/1986 | Letterman | |
| 4,966,802 A | * 10/1990 | Hertzberg | ............... 428/119 |
| 5,139,405 A | * 8/1992 | Krone et al. | ............... 425/116 |
| 5,681,513 A | 10/1997 | Farley | |
| 5,874,133 A | 2/1999 | Cochran | |
| 5,902,535 A | * 5/1999 | Burgess et al. | ............... 264/257 |
| 6,139,942 A | * 10/2000 | Hartness et al. | ......... 428/298.1 |
| 6,242,090 B1 | * 6/2001 | Green et al. | ............... 428/354 |
| 6,374,570 B1 | * 4/2002 | McKague, Jr. | ............... 52/762 |
| 6,391,436 B1 | * 5/2002 | Xu et al. | ............... 428/298.1 |

FOREIGN PATENT DOCUMENTS

| | | |
|---|---|---|
| EP | 0257148 A1 | 3/1988 |
| EP | 0278645 A | 8/1988 |
| EP | 0603066 A1 | 6/1994 |
| EP | 0 714 752 A2 * | 9/1996 |
| EP | 0933182 A2 | 8/1999 |
| EP | 0970800 A2 | 1/2000 |
| WO | WO 02/16197 | 2/2002 |

OTHER PUBLICATIONS

U.S. patent application Ser. No. 09/648,321, filed Aug. 25, 2000.

U.S. patent application Ser. No. 09/898,633, filed Jul. 2, 2001.

* cited by examiner

Primary Examiner—Stefan Staicovici
(74) Attorney, Agent, or Firm—Bracewell & Patterson, L.L.P.

(57) ABSTRACT

A method provides for full or partial infusion of resin into three-dimensional, woven textile preforms. Resin film is placed at selected locations adjacent the preform, and the resin film may be separated from other areas of the preform using separator sheets or other materials. The preform is heated and may be vacuum-bagged to apply pressure, or may be rolled or fed through a die. The heat and pressure cause the resin to infuse into the selected areas of the preform adjacent the resin films. The amount of resin in the partial infusion is the same as is necessary to fully infuse the preform, but the resin remains localized in the selected areas until heated again at cure to cause the resin to flow throughout the preform. The method may also be used to fully infuse the preform with resin by providing sufficient temperature and time at that temperature during the initial infusion.

27 Claims, 2 Drawing Sheets

METHODS OF HOT-MELT RESIN IMPREGNATION OF 3-D, WOVEN, TEXTILE PREFORMS

BACKGROUND OF THE INVENTION

1. Field of the Invention

This invention generally relates to infusion of resin into a woven textile and particularly relates to hot-melt infusion into three-dimensional, woven, textile preforms.

2. Description of the Prior Art

Generally, laminating resins are used as the matrix material in woven textiles., this also being true for woven preforms used to connect components made of composites or other materials. An example of a commonly-used laminating resin is 977-3, available from Cytec Industries, Inc., of West Paterson, N.J. Typically, the laminating resin is filly infused into a textile product, wetting all of the fiber bundles in the preform and forming a "prepreg," or pre-impregnated textile. The resin is later cured to form a polymer matrix in the finished composite component. Methods of fully impregnating flat textiles include immersing in a solution, pressing with rollers, and pulling through a die. All of these methods have the advantage of being able to do continuous lengths.

In solution impregnation, the resin is dissolved in a solvent, and the textile is immersed in the solution. The textile is then removed from the solution, and the solvent is evaporated, leaving the resin in the textile. The disadvantages of this method are that resin content is difficult to control and that the volatile gases must be removed.

FIG. 1 shows a prior art method of infusing resin into a textile 11 by placing resin film 13 against textile 11 and feeding them between a pair of heated rollers 15. Rollers 15 heat and press resin 13 into textile 11, transferring the resin 13 into textile 11.

FIG. 2 shows a second prior art method of infusing resin. The pultrusion method of infusing a textile 17 with resin 19 involves pulling textile 17 through a heated die 21. Resin 19 is placed against textile 17, and these are fed into the die to heat resin 19 and infuse textile 17. Die 21 may also cure resin while textile 17 is within die 21.

While these techniques work well for flat textiles, infusion of three-dimensional textile preforms presents different problems. The prior-art methods described above may be used to fully infuse 3-D preforms, but the preforms may have too much resin at intersections, causing the preform to be overly bulky in those areas. Also, a fully-infused preform tends to be stiff and less pliable, making the preform difficult to handle or position during assembly.

SUMMARY OF THE INVENTION

A method provides for full or partial infusion of resin into three-dimensional, woven, textile preforms. Resin film is placed at selected locations adjacent the preform, and the resin film may be separated from other areas of the preform using separator sheets or other materials. The preform is heated and may be vacuum-bagged to apply pressure, or may be rolled or fed through a die. The heat and pressure cause the resin to infuse into the selected areas of the preform adjacent the resin films. The amount of resin in the partial infusion is the same as is necessary to fully infuse the preform, but the resin remains localized in the selected areas until heated again at cure to cause the resin to flow throughout the preform. The method may also be used to fully infuse the preform with resin by providing sufficient temperature and time at that temperature during the initial infusion.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

DETAILED DESCRIPTION OF THE INVENTION

Figure 4:
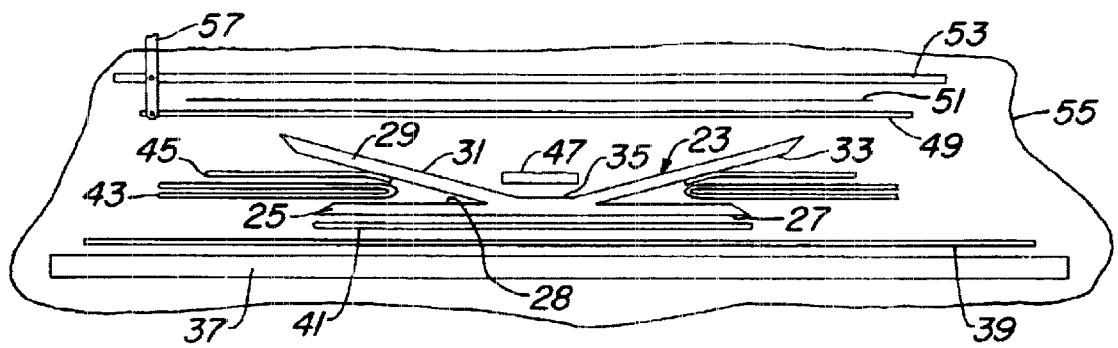
FIG. 4 is a front, exploded view of a method of fully infusing a three-dimensional textile preform with resin in accordance with the present invention.
Figure 5:
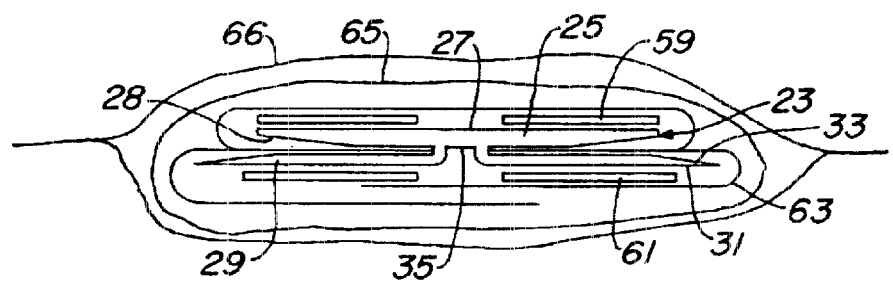
FIG. 5 is a front view of an alternative embodiment of the method of partially infusing a three-dimensional textile preform with resin in accordance with the present invention.
Figure 6:
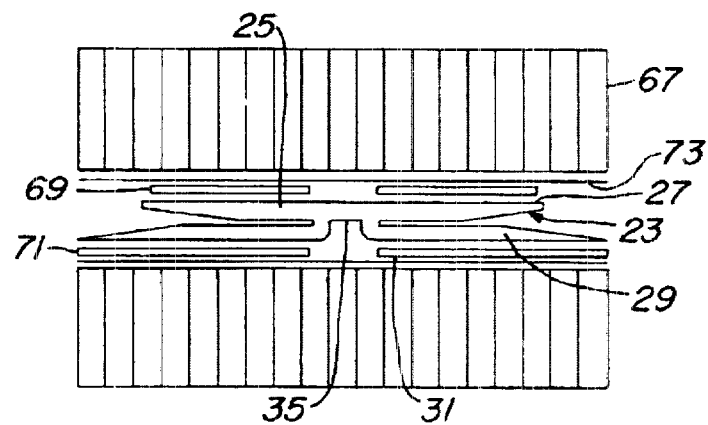
FIG. 6 is a front view of a second alternative embodiment of the method of partially infusing a three-dimensional textile preform with resin in accordance with the present invention.

The present invention provides for infusing a woven preform with laminating resin to form a polymer matrix in the cured preform. FIGS. 4 through 6 illustrate the preferred embodiments of the method of infusing a three-dimensional (3-D), woven textile preform used for assembling parts into structural joints, the preform being depicted in FIG. 3. The parts, or components, to be joined may be formed from composites and may be cured or uncured, or the parts may be formed from other materials, e.g., plastics, metals, etc. The infusion may be full or partial. A "full infusion" means that resin is infused through the entire thickness of the infused portions of the preform. A "partial infusion" causes the resin to enter the preform only to a depth that is less than the thickness of the infused portions of the preform or only around the fiber bundles without penetrating the bundles.

Figure 1:
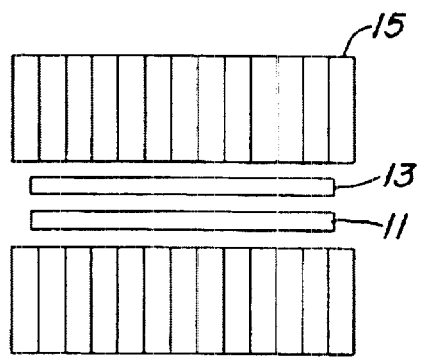
FIG. 1 is a front view of a prior art method of infusing textiles with resin.
Figure 2:
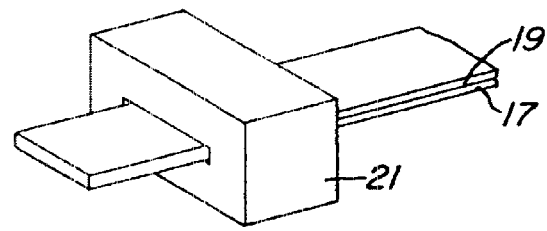
FIG. 2 is a perspective view of an alternative prior art method of infusing textiles with resin.
Figure 3:
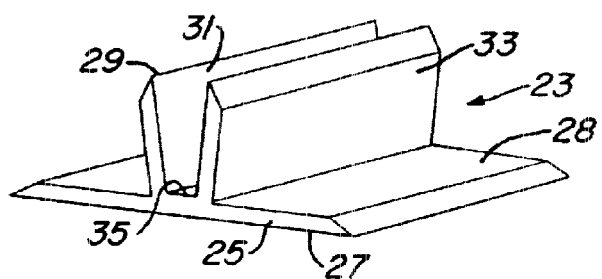
FIG. 3 is a perspective view of a three-dimensional, woven textile preform.

Referring again to the figures, FIG. 3 shows a pi-shaped, 3-D, woven preform 23 used to connect two parts (not shown), which may be, for example, a frame member and a skin. While preform 23 is shown as a Pi-shaped preform, the methods of infusion are applicable to other 3-D preform shapes, such as a T-shaped preform (not shown). Preform 23 has abase 25 on its lower portion that has a continuous, flat lower surface 27 and an upper surface 28. As shown, a pair of spaced-apart planar legs 29 extend vertically upward from base 25. Each leg 29 is at a position that is offset from, but near to, the center of base 25. In their installed orientation, legs 29 are typically parallel to each other and are typically perpendicular to base 25, with inner surfaces 31 of legs 29 facing each other. Outer surfaces 33 of legs 29 face outward when legs 29 are standing upright. A small, upward-facing surface 35 of base 25 lies between the lower ends of legs 29. Though it is preferable for legs 29 and base 25 to be tapered at their outer edges, as shown, the edges may also be squared. Though not shown, legs 29 may also be installed at an angle other than 90° from base 25, and legs 29 may not be parallel to each other.

FIG. 4 depicts a vacuum-assist method for fully infusing resin into preform 23 by creating a stack of layers of resin and separators and applying a vacuum to the stack. The resin is weighed to provide for the correct resin to fiber ratio. A rigid tool plate 37 is provided, and a non-porous, non-stick film 39, preferably Teflon-coated, is laid on the upper surface of tool plate 37. Preform 23 is placed on resin film 41, which is laid on film 39 and positioned to be under lower surface 27 of preform 23, film 41 preferably extending to the outer edges of base 25. Resin film 41 is a carrier sheet having resin on one side, the resin being transferred from the sheet when resin film 41 is heated. The carrier sheet is then removed and discarded.

During the infusion process, legs 29 are laid over to a horizontal orientation parallel with base 25, though legs 29 are each shown in the exploded view of FIG. 4 at an angle to base 25. A separator film 43 and a resin film 45 are placed between outer surface 33 of each leg 29 and the corresponding portion of upper surface 28. Separator film 43 is a non-stick separator film like film 39, but which is doubled over to provide a non-stick surface against outer surface 33 and upper surface 28 when placed between surfaces 28,33. Resin films 45, which are of the same type as resin film 41, are located between separator film 43 and outer surface 33 on each side of preform 23, the inner end of each film 43 being positioned to be at the intersection of leg 29 and base 25. Legs 29 are then laid over onto resin films 45.

A compaction tool 47, which may be made from rigid or semi-rigid materials, is sized to be placed on upward-facing surface 35 between the lower ends of legs 29. A layer of thin, Teflon-coated, porous cloth 49, for example, TX1040, available from Pall Corporation of East Hills, N.Y., is laid on the inner surfaces 31 of legs 29 and is then covered by an upper separator film 51 like films 39,43. The uppermost layer of the stack is a breather material 53, for example, dry fiberglass cloth. The entire stack, including tool 39, preform 23 and all layers of film and separators, is then placed within a bag 55 for creating a vacuum around the stack while the stack is heated. A vacuum vent 57 enters bag 55 and connects to cloth 49 and breather material 53 to assist the vent paths in cloth 49 and material 53.

To cause the resin to infuse into preform, a vacuum is pulled on bag 55 and the stack is heated to around 190° F. to soften the resin on films 41, 45, causing the resin to freely flow through preform 23. The vacuum within bag 55 allows air pressure outside bag 55 to press inward, forcing the various components of the stack together. The heat causes resin on film 41 to soften and the pressure causes the resin to move into base 25. The stack is heated to a temperature and held at that temperature for a sufficient length of time to allow the resin to fully wet the fibers of base 25, from lower surface 27 to upper surfaces 28 and upward-facing surface 35. Likewise, resin on films 45 softens and flows into legs 29, from outer surfaces 33 to inner surfaces 31, fully wetting the fibers of leg 29. Separator film 39 prevents resin from adhering to tool 37, whereas separator films 43 prevent resin on films 45 from flowing into base 25 and prevent outer surfaces 33 of legs 29 from tacking to upper surfaces 28 of base 25. Also this method could be used to partially infuse preform 23, rather than fully infuse. Furthermore the resin could be deposited on inner surfaces 31 of legs 29, rather than on outer surfaces 33. By depositing resin on inner surfaces 31, surfaces 31 can be tacked to the outer surfaces of the frame member (not shown) during assembly.

The air pressure outside of bag 55 pushes on bag 55 and forces breather material 53, separator film 51, and porous cloth 49 downward toward inner surfaces 31 of legs 29. This movement forces compaction tool 47 downward onto surface 35, compacting surface 35 and creating a flat, compacted area having a width equal to the width of tool 47. When, after infusion, preform 23 is used to join a first component (not shown) under base 25 to a second component (not shown) located between legs 29, the flat, compacted area at surface 35 ensures that the end of the second component is able to be seated properly against surface 35. Legs 29 are then moved to a vertical orientation to adhere to the second component.

In most applications, it is preferable to have a partially-infused preform, since fully-infused preforms can be stiff and difficult to position during assembly. The partial-infusion method leaves vent paths between the fiber bundles, allowing air, moisture, and volatiles to be removed, thereby limiting porosity after curing. An alternative vacuum-assist method, as shown in FIG. 5, can be used to partially or fully infuse Pi-shaped preform 23, which is shown as inverted from the orientation shown in FIG. 4. Referring to FIG. 5, legs 29 of preform 23 are laid over and resin films 59, 61 are placed against base 25 and each leg 29, respectively. Unlike resin film 41 (FIG. 4), each resin film 59, 61 has a width less than the width of preform 23. Resin films 59, 61 do not overlie the central portion of base 25 between legs 29. Each resin film 59 is placed against surface 27 of base 25 and located toward the outer edge of base 25, leaving no resin film near surface 35. Resin film 61 is placed against inner surface 31 of each leg 29. A thin film 63, preferably polyethylene, is wrapped around preform 23 and resin films 59, 61, a vent material 65 being wrapped around film 63. Film 63 is inserted into the areas between surfaces 28 of base 25 and outer surfaces 33 of legs 29 to act as a separator film and to contain the resin within preform 23, preventing the resin from wicking into vent material 65. A vacuum bag 66 surrounds preform 23, film 63, resin films 59,61, and vent material 65.

To partially infuse preform using the method in FIG. 5, the air is removed from within bag 66, and then bag 66 and its contents are heated to around 120° F. for 15–20 minutes. This temperature permits the resin on films 59,61 to flow enough to be deposited into preform 23 without fully wetting the fiber bundles and keeping the intersections preferably resin-free. This provides within preform 23 the amount of resin necessary to fully infuse preform 23, but it is located in discrete areas of preform 23. Partially-infused preform 23 remains more pliable, since no resin is located in the intersections of legs 29 and base 25. Because base 25 at surface 35 is not infused with resin, no compaction is needed to ensure proper seating on surface 35 of a component (not shown) inserted between legs 29. The areas lacking resin also become vent paths for air or volatile gases during full wetting and curing after assembly. Preferably, partially-infused preform 23 is simply brought to a curing temperature, allowing the resin to freely flow within preform 23 to fully infuse preform 23. Another method of fully wetting the fibers of preform 23 after assembly is to bring the temperature of preform 23 up to around 190° F., allowing the resin to fully wet preform 23, then curing preform 23 in the desired final position in a separate process.

Rather than partially infusing preform 23 initially, then heating preform 23 to allow the resin to flow and fully infuse preform 23, the temperature of the initial heating of preform 23 and resin films 59, 61 can be around 190° F. This would allow the resin to fully infuse preform 23 in the initial step, instead of requiring the second heating step. Also, though not shown in FIG. 5, resin films having a width nearly that of preform 23 can be used to fully or partially infuse preform 23. To partially infuse preform 23 using full-width resin films, separator films or other materials are placed between selected portions of preform 23 and the resin films, preventing resin from entering preform 23 at those locations when resin is heated.

FIG. 6 shows an alternative embodiment of the present invention for fully or partially infusing resin into preform 23. Heated rollers 67 provide the heat and pressure to cause resin on films 69,71 to flow into portions of preform 23. Like resin films 59,61 (FIG. 5) as described above, resin films 69, 71 are located against surfaces 27, 31, respectively. Resin films 69, 71 have a width less than the width of preform 23 and do not overlie a central space between legs 29. Separator films 73 are located between resin films 69, 71 and rollers 67 for ensuring resin does not adhere to rollers 67. Preform 23 and resin films 69, 71 are fed into the gap between rollers 67, the gap being sized to compact the stack of films 69, 71 and preform 23 as they move between rollers 67. Like in the method shown in FIG. 5, the method shown in FIG. 6 provides for resin being placed in selected areas of preform 23 when the resin is heated to around 120° F., and resin is absent in base 25 near surface 35 and in the intersections of legs 29 with base 25. After assembly, preform 23 is heated to around 190° F. to allow resin to fully disperse within preform 23.

As described above, the temperature of the initial heating of preform 23 and resin films 59, 61 can be around 190° F., allowing the resin to fully infuse preform 23 in the initial step. Also, resin films having a width nearly that of preform 23 can be used to fully or partially infuse preform 23. To partially infuse preform 23 using full-width resin films, separator films or other materials are placed between selected portions of preform 23 and the resin films, preventing resin from entering preform 23 at those locations when resin is heated.

Figure 7:
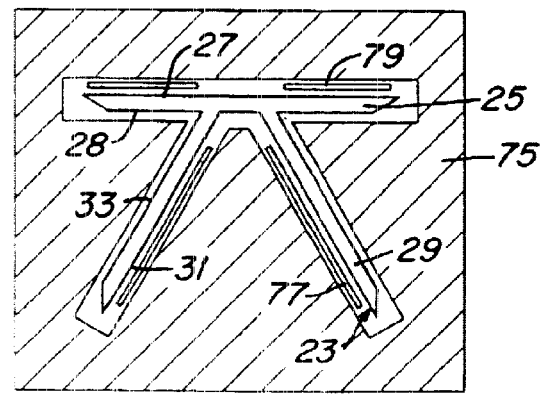
FIG. 7 is a front view of a third alternative embodiment of the method of partially infusing a three-dimensional textile preform with resin in accordance with the present invention.

As shown in FIG. 7, another embodiment of the method of the present invention is a pultrusion method. As described above, a pultrusion method uses a heated die 75 to heat resin films 77, 79 and cause the resin on films 77, 79 to transfer to surfaces 31, 27, respectively, of preform 23. In the figure, there are no resin films located against surface 28 of base 25 or surfaces 33 of legs 29, though additional resin films may be located against surfaces 28, 33. Preform 23 may be partially or fully infused by controlling the temperature of die 75, as described above for the various embodiments.

The advantages of the present invention include the ability to fully or partially infuse three-dimensional, woven textile preforms. In the partial infusion, selected amounts of resin are infused into discrete locations of the preforms. The partially-infused preforms provide a tacky surface when the preforms are used to assemble components, are more pliable without resin having been infused into the intersection of planar portions of the preform, and provide for better seating of components being assembled.

While the invention has been shown in only some of its forms, it is not thus limited but is susceptible to various changes and modifications without departing from the spirit thereof.

We claim:

1. A method for infusing resin into a textile preform and bonding the preform to a component, the method comprising:

(a) providing a three-dimensional, woven, textile preform;

(b) placing resin films adjacent selected surfaces of the preform, the resin films containing an amount of resin; then (c) heating the resin films for a time and to a temperature to cause the resin to only partially infuse into the preform through the selected; then (d) placing the preform in contact with a component and applying a higher temperature to the preform than in step (c) to cause the resin to fully diffuse through the preform and cure to bond the preform to the component.

2. The method of claim 1, wherein:

step (a) comprises providing the preform with a base and a pair of legs, each leg forming an intersection with the base; and the selected surfaces of step (b) exclude the intersections of the legs with the base.

3. The method of claim 1, wherein:

step (a) comprises providing the perform with a base and a pair of legs, each leg forming an intersection with the base; and the selected surfaces of step (b) exclude the portion of the base between the legs.

4. The method of claim 1, wherein:

the preform is Pi-shaped, having a base with a pair of legs extending therefrom, defining two intersections with the base; and wherein step (b) further comprises blocking the intersections and the portion of the base between the legs from contact with the resin films.

5. The method of claim 1, wherein:

step (c) further comprises applying pressure to press the resin films against the selected surfaces to assist in infusion of resin into the selected surfaces.

6. The method of claim 5, wherein:

surrounding the preform and resin films with a vacuum bag provides the pressure.

7. The method of claim 5, wherein:

a pair of rollers provide the pressure.

8. The method of claim 5, wherein:

a pultrusion die surrounding the preform and resin films provides the pressure.

9. The method of claim 1, further comprising:

inserting separator films between adjacent selected resin films for preventing resin from infusing into surfaces of the preform adjacent the separator films.

10. A method for infusing resin into a textile preform, the method comprising:

(a) providing a woven, textile preform having a base and a pair of legs, the legs being separated from each other and extending from a central portion of the base, each leg having an inner surface and an outer surface;

(b) folding each of the legs apart substantially parallel to and overlying a first surface of the base;

(c) inserting a barrier sheet between the first surface of the base and the outer surface of each of the legs;

(d) placing a resin film in contact with a second surface of the base on a side of the base opposite the first surface;

(e) placing a resin film in contact with the inner surfaces of the leg; and (f) applying heat and pressure to the resin film.

11. The method of claim 10, wherein:

step (c) comprises placing the barrier sheet in contact with the central portion of the base.

12. The method of claim 10, wherein:

step (c) comprises leaving the central portion of the base free of contact with the barrier sheet.

13. The method of claim 10, wherein:
step (f) further comprises surrounding the preform, resin films, and barrier sheets with a vent material and a vacuum bag.

14. The method of claim 10, wherein:
surrounding the preform and resin films with a vacuum bag provides the pressure.

15. The method of claim 10, wherein:
a pair of rollers provide the pressure.

16. The method of claim 10, wherein:
a pultrusion die surrounding the preform and resin films provides the pressure.

17. A method for infusing resin into a textile preform, the method comprising:
(a) providing a woven, textile preform having a base and a pair of legs, the legs being separated from each other and extending from a central portion of the base, each leg having an inner surface and an outer surface;
(b) folding each of the legs apart substantially parallel to and overlying a first surface of the base;
(c) inserting a barrier sheet between the first surface of the base and the outer surface of each of the legs;
(d) placing a resin film in contact with a second surface of the base on a side of the base opposite the first surface;
(e) placing a resin film in contact with at least one of the surfaces of each leg; then
(f) surrounding the preform and resin films with a vacuum bag to apply pressure to the resin film; and
(g) applying heat to the resin film.

18. The method of claim 17, wherein:
step (e) comprises placing one of the resin films in contact with the inner surface of each leg, the resin film being between the barrier sheet and the leg.

19. The method of claim 17, wherein:
step (e) comprises placing one of the resin films in contact with the outer surface of each leg.

20. The method of claim 17, wherein:
step (f) further comprises surrounding the preform, resin films, and barrier sheets with a vent material.

21. A method for infusing resin into a textile preform, the method comprising:
(a) providing a woven, textile preform having a base and a pair of legs, the legs being separated from each other and extending from a central portion of the base, each leg having an inner surface and an outer surface;
(b) inserting a barrier between a first surface of the base and the outer surface of each of the legs;
(c) placing a resin film in contact with a second surface of the base on a side of the base opposite the first surface;
(d) placing a resin film in contact with one of the surfaces of each of the legs; and
(e) applying heat and pressure to the resin films to infuse resin into the base and the legs.

22. The method of claim 21, wherein:
step (e) comprises limiting the heat and pressure so as to only partially infuse the resin into the preform.

23. The method of claim 21, wherein:
step (e) comprises enclosing the preform, resin films, and bafflers with a vacuum diaphragm and evacuating the diaphragm to apply pressure to the perform, resin films and barriers.

24. A method for infusing resin into a textile preform, the method comprising:
(a) providing a woven, textile preform having a base and a pair of legs, the legs being separated from each other and extending from a central portion of the base, each leg having an inner surface and an outer surface;
(b) inserting a barrier sheet between a first surface of the base and the outer surface of each of the legs;
(c) placing a resin film in contact with a second surface of the base on a side of the base opposite the first surface;
(d) placing a resin film in contact with at least one of the surfaces of each leg; then
(e) surrounding the preform and resin films with a flexible vacuum diaphragm, and evacuating the diaphragm to apply pressure to the resin films; and
(f) applying heat to the resin films for a time and temperature sufficient to only partially infuse the perform with resin.

25. The method of claim 24, wherein:
step (d) comprises placing one of the resin films in contact with the inner surface of each leg.

26. The method of claim 24, wherein:
step (d) comprises placing one of the resin films in contact with the outer surface of each of the legs.

27. The method of claim 24, wherein:
step (e) further comprises surrounding the preform, resin films, and barrier sheets with a vent material.

* * * * *